United States Patent
Vaidya

(10) Patent No.: US 6,279,113 B1
(45) Date of Patent: Aug. 21, 2001

(54) DYNAMIC SIGNATURE INSPECTION-BASED NETWORK INTRUSION DETECTION

(75) Inventor: Vimal Vaidya, Fremont, CA (US)

(73) Assignee: Internet Tools, Inc., Fremont, CA (US)

( * ) Notice: Subject to any disclaimer, the term of this patent is extended or adjusted under 35 U.S.C. 154(b) by 0 days.

(21) Appl. No.: 09/090,774

(22) Filed: Jun. 4, 1998

Related U.S. Application Data

(60) Provisional application No. 60/078,759, filed on Mar. 16, 1998, and provisional application No. 60/078,328, filed on Mar. 17, 1998.

(51) Int. Cl.[7] .................................................... H04L 9/00
(52) U.S. Cl. ........................ 713/201; 713/154; 709/229
(58) Field of Search .................................. 713/201, 200, 713/202, 151, 152, 153, 154–176, 177, 178; 709/229; 707/9

(56) References Cited

U.S. PATENT DOCUMENTS

| | | | |
|---|---|---|---|
| 5,278,901 | * 1/1994 | Shieh et al. ............................ | 713/200 |
| 5,414,833 | * 5/1995 | Hershey et al. ....................... | 713/201 |
| 5,557,742 | 9/1996 | Smaha et al. ......................... | 395/186 |
| 5,720,033 | 2/1998 | Deo ....................................... | 395/186 |
| 5,727,146 | 3/1998 | Savoldi et al. .................... | 395/187.01 |
| 5,948,104 | * 9/1999 | Gluck et al. .......................... | 713/200 |
| 5,991,881 | * 11/1999 | Conklin et al. ....................... | 713/201 |
| 6,035,423 | * 3/2000 | Hodges et al. ......................... | 714/38 |
| 6,088,804 | * 7/2000 | Hill et al. ............................... | 713/201 |

OTHER PUBLICATIONS

Mukherjee, Biswanath et al., "Network Intrusion Detection," *IEEE Network*, 0890–8044/94, May/Jun. 1994, pp. 26–41.

* cited by examiner

*Primary Examiner*—Robert Beausoleil
*Assistant Examiner*—Scott Baderman
(74) *Attorney, Agent, or Firm*—Luce, Forward, Hamilton & Scripps LLP

(57) ABSTRACT

A signature based dynamic network intrusion detection system (IDS) includes attack signature profiles which are descriptive of characteristics of known network security violations. The attack signature profiles are organized into sets of attack signature profiles according to security requirements of network objects on a network. Each network object is assigned a set of attack signature profiles which is stored in a signature profile memory together with association data indicative of which sets of attack signature profiles correspond to which network objects. A monitoring device monitors network traffic for data addressed to the network objects. Upon detecting a data packet addressed to one of the network objects, packet information is extracted from the data packet. The extracted information is utilized to obtain a set of attack signature profiles corresponding to the network object based on the association data. A virtual processor executes instructions associated with attack signature profiles to determine if the packet is associated with a known network security violation. An attack signature profile generator is utilized to generate additional attack signature profiles configured for processing by the virtual processor in the absence of any corresponding modification of the virtual processor.

20 Claims, 12 Drawing Sheets

DYNAMIC SIGNATURE INSPECTION-BASED NETWORK INTRUSION DETECTION

This application claims the benefit of U.S. Provisional Application No. 60/078,759, filed Mar. 16, 1998, and U.S. Provisional Application No. 60/078,328, filed Mar. 17, 1998.

TECHNICAL FIELD

The present invention relates generally to a method and system for providing security on a communication system and, more particularly, the invention relates to detecting intrusion attempts into system resources by monitoring for attack signatures.

DESCRIPTION OF THE RELATED ART

Computer networks enable multiple communication devices such as computers, fax machines, and modems to communicate with each other. In systems which employ a client-server computing model, server devices can generally be viewed as being a service provider and client devices are consumers of the services. Instead of each device on a network being self-sufficient, resources are contained in servers, which extend capabilities throughout the network. Client devices access the resources necessary to perform functions from the servers. For instance, a user might use a client application to obtain a compound document, perhaps an annual sales report containing spread sheet graphs and explanatory text, where part of the document is located on a first server (the text) and another part is located on a second server (the graphs).

Although the client-server system can provide an efficient means for managing resources of a computer system, significant security issues arise regarding control of access to sensitive material stored on the servers. Large corporate networks often include servers storing sensitive material, access to which must be closely regulated. Often the set of client objects which are permitted access to a particular server application will change over time. A significant need remains for a security system which regulates access to certain objects on a computer system and which provides the flexibility to allow for the changing requirements of security of the system.

U.S. Pat. No. 5,720,033 to Deo describes a security platform for networked processors which limits access to system resources by implementing a rules based system for types of access of security interests to one or more served application programs. The platform provides rule sets, each of which associates an access type with a subject. An example of a subject is a particular user. Optionally, the rule sets also associate an access type with a set of objects, which are specific system resources to which access is sought. Access demands made by a particular served application are compared to the rule sets to determine whether the access demanded is permissible. The platform permits access by a subject to an object if a rule is found for (a) the access type or (b) an access class to which the access type belongs which defines access between (A) either (i) the subject or (ii) a superclass to which the subject belongs and (B) either (i) the object or (ii) the superclass to which the object belongs.

Although the security platform described above provides a partial solution to the network security problem by enabling detection of unauthorized access attempts which are based in the application layer of the OSI model, the security platform is unable to detect network intrusions based in lower levels of the OSI model. The security platform might be unable to detect an attempt to deliver a malicious data packet capable of causing a malfunction in a network object upon delivery because the security platform regulates access to a network object based on the identity of a subject. Consequently, a subject which is authorized to access a network object can deliver a malicious packet to that network object without being detected. The security platform described above is designed for access control to an object residing on a particular UNIX server. However, the platform is ineffective for detection of network security breaches unrelated to access control, such as transmission of malicious data packets.

U.S. Pat. No. 5,727,146 to Savoldi et al. describes a source address security system for both training and non-training objects, wherein network access to a port is secured by monitoring the source address of packets that are sent as a device attempts to transmit to the port over the network. If the source address of a packet matches an authorized source address assigned to the port, then the device is permitted to access the network. The source address security system requires that the address of all devices authorized to access a network be known so that the source address of a device which has transmitted a particular packet can be compared to source addresses of all authorized devices to determine if the device in question is permitted to access the network. Only if the source address of a device is known to the security system will the device be allowed to access the network.

A static signature database intrusion detection system (IDS) overcomes some of the above described limitations by providing a static signature database engine which includes a set of attack signature processing functions, each of which is configured to detect a specific intrusion type. Each attack signature is descriptive of a pattern which constitutes a known security violation. The system monitors network traffic by sequentially executing every processing function of a database engine for each data packet received over a network. Each processing function of the database engine is integrally associated with a corresponding attack signature making it problematic to incorporate new attack signatures into an existing static signature database. An entirely new database engine must be constructed in order to incorporate a new attack signature. This limitation also results in the built-in IDS not being able to allow addition and customization of new signatures. Furthermore, a built-in database IDS suffers from performance loss due to the sequential execution of every processing function for each packet received over the network. The IDS performance degrades further as more signatures are added to the database engine because of the resulting delay caused by the sequential processing by the static database engine.

What is needed is a network intrusion detection system which provides efficient extensibility to include newly discovered network attack signatures and which allows modifications to recognize new attack signatures without substantially affecting performance of the network intrusion detection.

SUMMARY OF THE INVENTION

A dynamic signature inspection-based network intrusion detection system and method include a processor which is configured such that it is mutually independent from configuring storage of attack signature profiles. In a preferred embodiment, the processor may be implemented either as a virtual processor in software or as an actual hardware processor. The mutual independence of the processor from the attack signature profiles allows additional attack signature profiles to be integrated into the intrusion detection system without requiring any corresponding modification of the processor. The mutual independence of the processor from the attack signature profiles also enables the system to allocate processing requirements of network monitoring for attack signatures among various sites on the network according to a distribution of network objects in order to maintain high performance of the dynamic signature inspection-based network IDS.

The dynamic signature-based network IDS includes multiple attack signature profiles which are each descriptive of identifiable characteristics associated with particular network intrusion attempts associated with network objects located on the network. Network intrusion attempts include unauthorized attempts to access network objects, unauthorized manipulation of network data, including data transport, alteration or deletion, and attempted delivery of malicious data packets capable of causing a malfunction of a network object. The attack signature profiles can include generic attack and/or customized attack signature profiles for particular network objects on the network. Customized attack signature profiles can be added to a set of generic attack signature profiles without having to modify the processor, thereby facilitating efficient customization of the IDS.

The attack signature profiles are organized into sets of attack signature profiles which are assigned to network objects based on security requirements of the network objects, and these sets of signature profiles are stored in a signature profiles memory. The signature profile memory of a network defines the network data signaling patterns which constitute network intrusion attempts with regard to that network. Association data is stored in the signature profile memory and corresponds each of the network objects to associated set or subset of signature profiles, such that multiple sets of signature profiles are assigned to the set of network objects.

Data transmitted over the network is monitored by a data monitoring device to detect data addressed to the network objects. Upon detecting data addressed to one of the network objects, a set of signature profiles corresponding to that network object is accessed from the signature profile memory based on the association data. At least one attack signature profile from the set of profiles is processed by the processor to determine if the data addressed to the network object is associated with a network intrusion.

In a preferred embodiment multiple data collectors, each of which includes a data monitoring device, an attack signature profile memory, and a processor, are deployed at multiple sites in different segments of the network. A network configuration generator assigns sets of attack signature profiles to each data collector based on the network objects located on the network segment on which each data collector is deployed. A particular data collector monitors network data only for data addressed to the network objects located on that data collector's network segment. By distributing the network monitoring responsibilities among multiple data collectors, high performance of the dynamic signature-based network IDS is maintained. Instead of a single data collector monitoring the entire network data for network intrusion attempts, each data collector only monitors a network segment on which it is located or a point of entry from an open network, such as the Internet.

The dynamic signature-based network IDS employs at least three different types of attack signature profiles: a sequential, a simple, and a timer-counter based attack signature profile. A simple attack signature profile provides instructions to the processor which, when executed, can detect a single occurrence of an event associated with a network intrusion attempt. If processing of a simple attack signature profile reveals an occurrence of the event, a network intrusion attempt has been detected.

A sequential attack signature profile directs the processor to sequentially execute a series of instructions on data which constitutes at least a portion of an application session. The series of instructions is configured to detect a corresponding sequence of events which collectively are associated with a network intrusion attempt. Upon detecting each event associated with each instruction, the processor stores data indicative of the occurrence of that event in a state cache. The state cache is accessed by the processor to determine whether the entire series of events associated with the network intrusion attempt has occurred.

The timer-counter based attack signature profile directs the processor to execute an instruction which is configured to detect a particular event. The instruction is executed on each packet associated with an application session. A time stamp entry and a counter entry is made for each event detected by executing the instruction. If the number of times the event occurs within a predetermined time interval exceeds a preselected threshold, a network intrusion attempt has been detected.

An advantage of the present invention is that all seven layers of the OSI model are monitored and so an attack based in any of the layers can be detected. Another advantage is that the mutual independence of the processor and the attack signature profile enables efficient customization of the IDS according to the security requirements of a network. Yet another advantage of the present invention is the high performance which the IDS is able to provide on large networks by allocating network monitoring responsibilities to multiple monitoring devices at multiple sites on the network.

DETAILED DESCRIPTION

Figure 1:
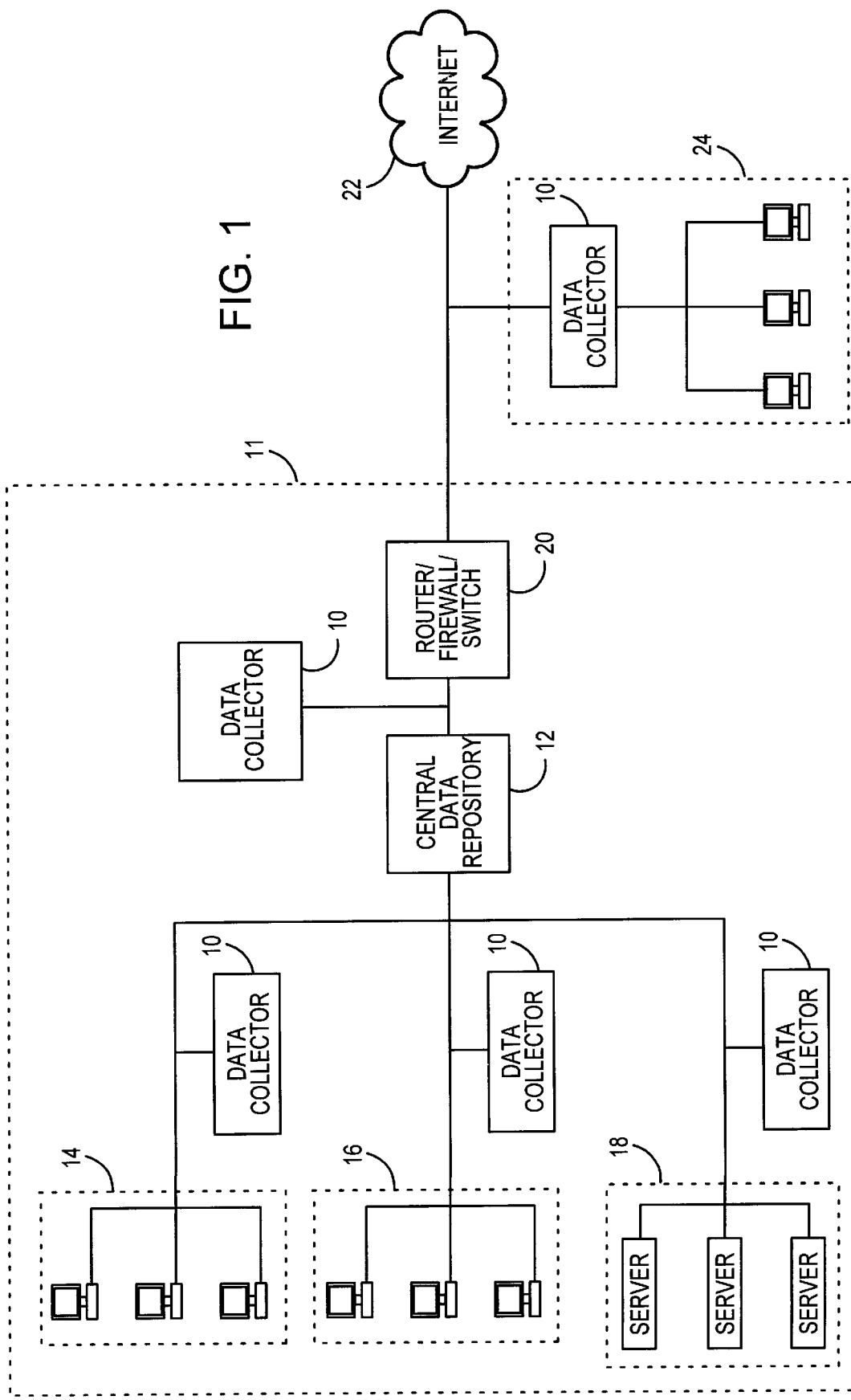
FIG. 1 is a block diagram showing a network on which a network IDS according to the current invention is deployed.

Referring to FIG. 1, a preferred embodiment of a dynamic network-based signature inspection network Intrusion Detection System (IDS) includes a central data repository 12 and multiple data collectors 10 located on a network such as a Local Area Network 11 (LAN). Although the data collectors 10 are illustrated as stand-alone devices, the function of a data collector can be included on other devices in the network, such as a server or a router/firewall/switch 20. Multiple data collectors 10 are preferred when the LAN 11 includes multiple network objects which the IDS must monitor for network intrusions. As will be discussed in greater detail below, allocating monitoring responsibilities among multiple data collectors 10 in such situations tends to maintain a high performance of the IDS. Two of the data collectors 10 are deployed on first and second LAN segments 14 and 16 each of which includes multiple workstations, a third data collector 10 is located on a server backbone 18 of the LAN 11 to monitor network traffic to and from the servers, a fourth data collector 10 is located proximate to the router/firewall/switch 20 to monitor incoming data to the LAN 11, and a fifth data collector monitors incoming data to a remote network 24.

The data repository 12 polls the data collectors 10 to obtain network security data, which the data repository 12 handles. The data repository 12 also provides an interface for an administrator of the IDS to establish a configuration of network objects on the LAN 11 and to distribute attack signature profiles to the data collectors 10 based on the network configuration. The attack signature profiles are adapted for detecting network data patterns associated with network intrusions which include unauthorized attempts to access network objects, unauthorized manipulation of network data, including data transport, alteration or deletion, and attempted delivery of malicious data packets capable of causing a malfunction in a network object. The remote network 24 is connected to the LAN 11 and is equipped with a data collector 10 which monitors work stations located on the remote network 24 and transmits network security data specific to the remote network back to the data repository 12. Both the remote network 24 and the LAN 11 are connected to the global communications network referred to as the Internet 22.

Figure 2:
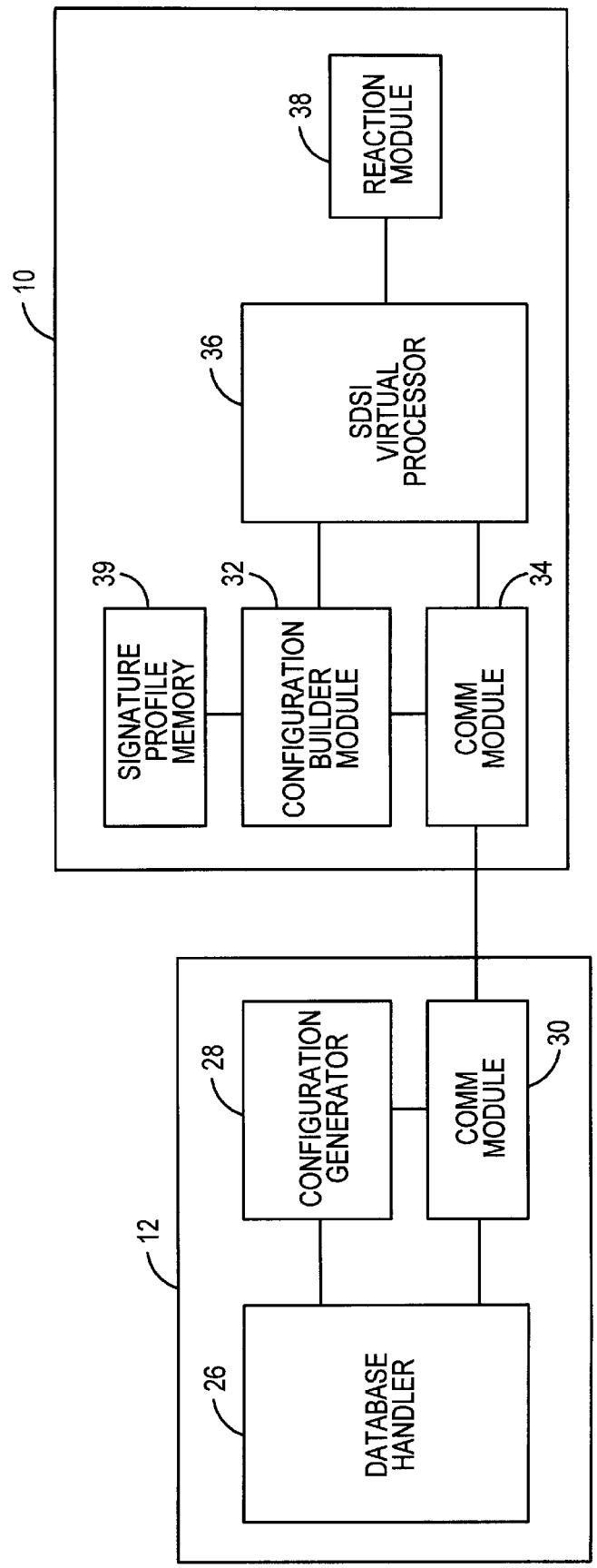
FIG. 2 is a block diagram of a data repository and a data collector employed in the operation of the network IDS shown in FIG. 1.

Referring to FIG. 2, the data repository 12 includes a database handler 26 which polls the data collectors 10 for intrusion detection data and stores the data for future reference. The database handler 26 also generates reports regarding intrusion detection history. A configuration generator 28 is connected to the database handler to enable the network administrator to define the configuration of network objects on the LAN 11 and the remote network 24. The configuration generator 28 also enables the administrator to define the connection of both the LAN 11 and the remote network 24 to the Internet 22. The network objects include devices such as the servers and workstations, as well as routers, firewalls and switches. Network objects further include applications and files stored in memory within those devices. Based on the network configuration data generated by the configuration generator 28, the database handler 26 assigns sets of attack signature profiles to each data collector 10. A communication module 30 is used by the data repository 12 to transmit and receive data to and from the data collectors 10. For example, the communication module 30 downloads network configuration data to the data collectors 10.

Each data collector 10 includes a communication module 34 for transmitting and receiving information to and from the data repository 12. A configuration builder module 32 assigns a set of signature profiles to each network object and stores data representative of associations between network objects and attack signature profile sets in a signature profile memory 39. The configuration builder module 32 accesses the appropriate attack signature profile sets during operation of the data collector 10 and provides the attack signature profiles to a stateful dynamic signature inspection (SDSI) virtual processor 36. The attack signature profiles include a set of instructions which the virtual processor 36 executes to determine whether a particular data packet is associated with a network intrusion. Although a preferred embodiment of the processor employs the software based virtual processor 36 to execute attack signature profiles, a hardware based processor can be employed in the place of the virtual processor 36. If the virtual processor 36 determines that a network intrusion has occurred, it alerts a reaction module 38, which initiates one of several reactions depending on the nature of the attack. The reaction module 38 can either terminate an application session associated with the network intrusion, trace the session, and/or alert the network administrator of the attack. The reaction module 38 is configured to automatically notify the network administrator via e-mail, fax, an SMNP trap, and/or by pager.

Figure 3:
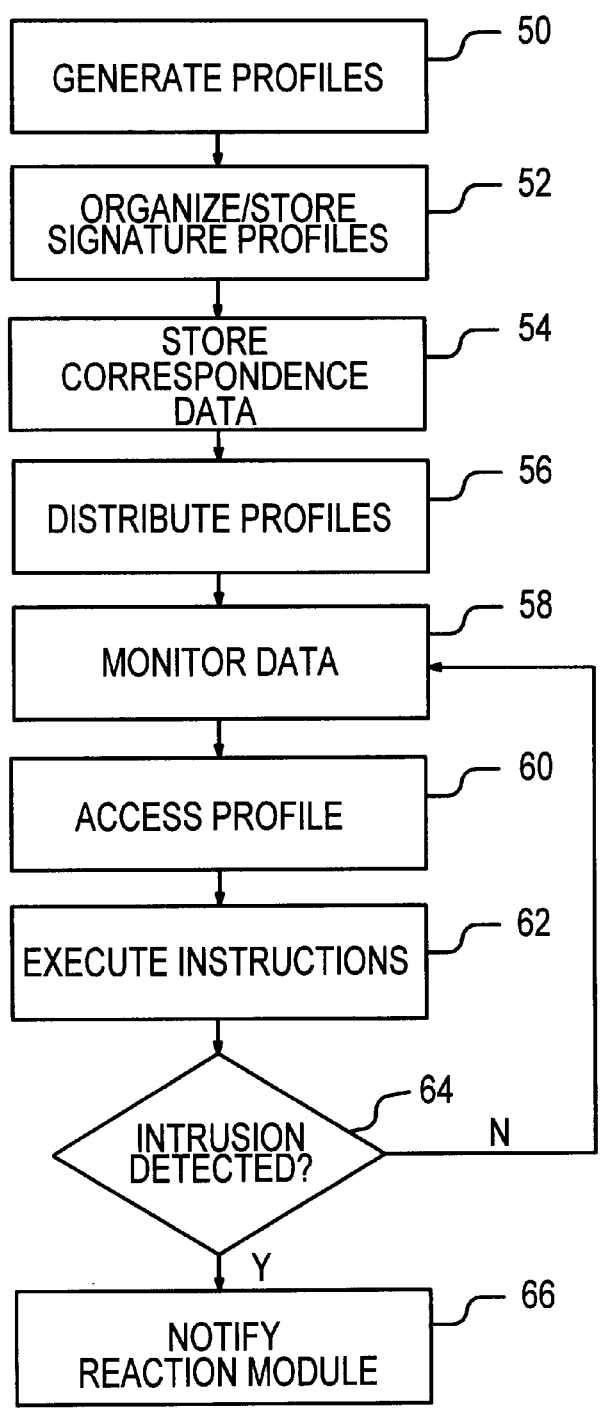
FIG. 3 is a process flow for an operation of a network IDS shown in FIG. 2.

With reference to FIGS. 2 and 3, a method for the operation of the dynamic signature inspection network IDS includes the step 50 of generating attack signature profiles. The attack signature profiles can be generic in that they describe generic network intrusion attempts which are common to most networks, or the attack signature profiles can be generated to be specific to a particular network by, for instance, indicating which network objects are not permitted to access other network objects. In step 52 sets of attack signature profiles are organized according to security requirements of each network object. In step 54, corresponding data that are indicative of which objects corresponds to which sets of attack signature profiles are stored in memory of the data repository 12. As noted above, network objects include servers, workstations, applications, files within applications, and devices such as routers, firewalls and switches.

The configuration generator 28 of the data repository 12 is utilized to establish a configuration of network objects. If more than one data collector 10 is deployed on a network, the configuration generator 28 stores information regarding which objects reside on each segment that a data collector 10 is monitoring and the sets of attack signature profiles required by each data collector. In step 56 the communication module 30 of the data repository 12 distributes the signature profiles to the various data collectors 10 throughout the network. Upon receiving a set or sets of attack signature profiles, each data collector 10 stores the set or sets of profiles it receives from the data repository 12 in its signature profile memory 39.

Each data collector 10 monitors network data in step 58 to detect packets addressed to network objects on the network segment on which the data collector 10 is located. For example, referring briefly to FIG. 1, the data collector 10 located on the first network segment 14 monitors network data for packets addressed to those workstations on the first network segment 14. When the data collector 10 detects a data packet addressed to a network object having an associated attack signature profile set in the signature profile memory 39, the data collector accesses the attack signature profile set in step 60 and processes attack signature profiles in step 62 to determine if the packet is associated with a network intrusion in step 64. The attack signature profile type can be either simple, sequential or a timer/counter based. If in step 64 the data collector 10 determines that the data packet is not associated with a network intrusion, the data collector continues to monitor data in step 58. If a network intrusion is detected, the reaction module is notified in step 66. The reaction module 38 takes steps to trace the application session associated with the data packet, to terminate the session, and/or to notify the network administrator.

Figure 4:
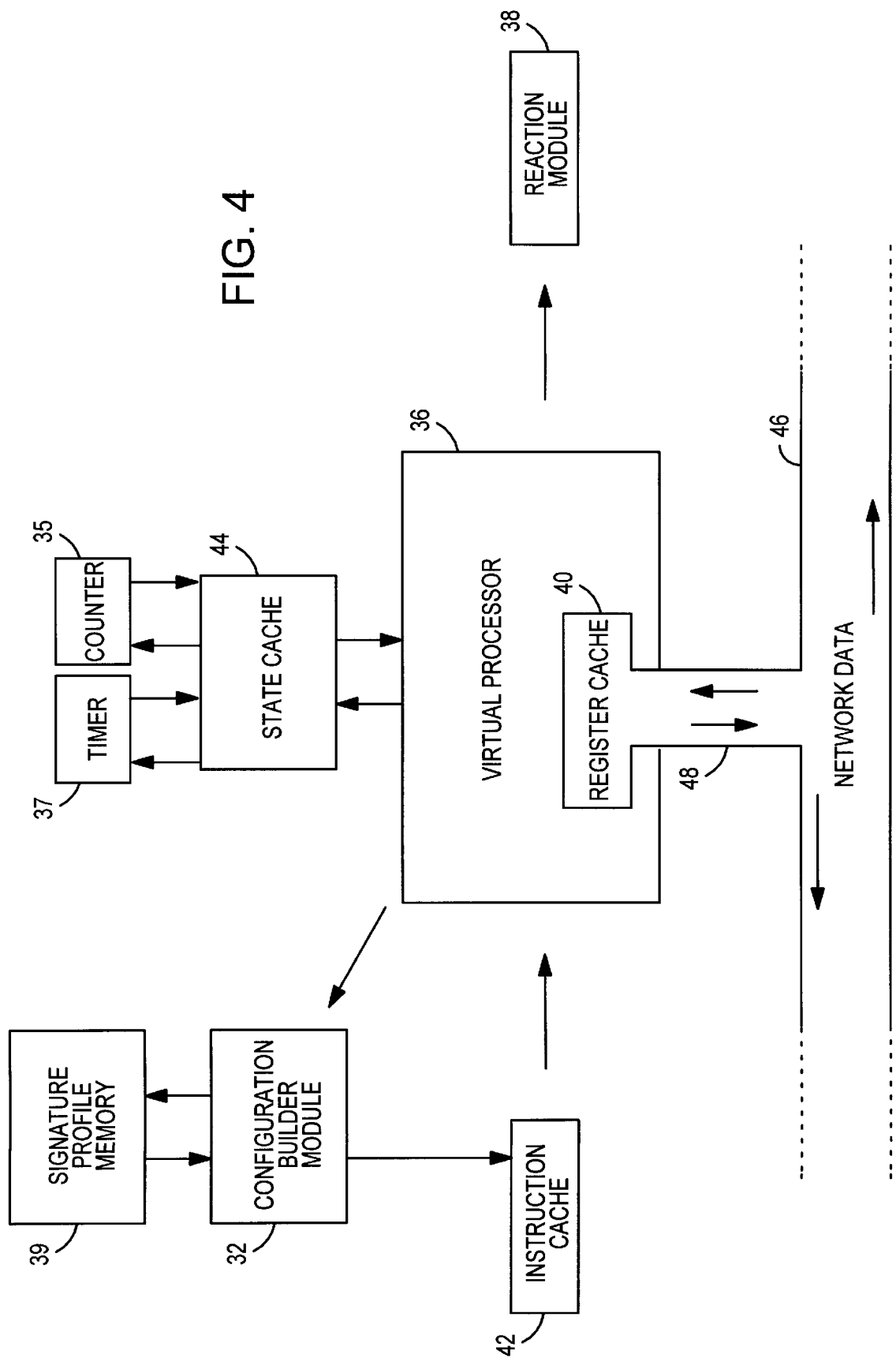
FIG. 4 is a schematic diagram illustrating the operation of a virtual processor shown in FIG. 2.

With reference to FIG. 4, the operation of the virtual processor 36 includes monitoring network data 46 to determine whether the data is associated with a network intrusion. A register cache 40 temporarily stores information extracted from a data packet which determines which signature profile(s) will be accessed from the signature profile memory 39. The virtual processor 36 obtains a data packet from a queue and extracts MAC header information, IP header information, transport header information, and application information from the data packet. Extraction of the packet information enables the data collector 10 to detect network intrusions based in the different layers of the OSI model.

The virtual processor 36 uses the extracted packet information to determine to which server and application the packet is addressed. The virtual processor 36 communicates the server/application information to the configuration builder module 32, which accesses the applicable set of attack signature profiles from the signature profile memory 39.

The configuration builder module 32 temporarily stores the applicable attack signature profiles in an instruction cache 42. The virtual processor 36 processes the attack signature profiles to determine whether the packet is associated with a network intrusion attempt. A simple attack signature profile might provide instructions to determine if a data packet, which is addressed to server X for access to application Y, has a source address of user Z. In this example, a network administrator has determined that user Z is not authorized to access application Y on server X. If, upon executing the simple attack profile instructions the virtual processor 36 recognizes that the source address for the data packet is user Z, the virtual processor 36 notifies the reaction module 38, which then takes an appropriate action.

Simple attack signature profiles include only a single expression. In the example above the expression can be described as "is source address user Z?" Two other types of attack signature profiles, sequential and timer/counter based, require sequential execution of an instruction or instructions associated with an attack signature profile.

The sequential attack signature profiles include multiple expressions. For instance, these expressions might include "is source address user Z?" and "is user Z attempting to access file A?" Instructions associated with the first expression are executed on a first packet associated with an application session to determine that the packet has the user Z source address. However, if this first packet does not include information that user Z is attempting to access file A in application X, a subsequent packet associated with the same application session will have to be analyzed to determine if user Z is attempting to access file A. An entry is made into a state cache 44 to indicate that the first expression was satisfied. The state cache 44 satisfies the need for a record to be made indicating which expressions in the sequential attack signature profile have been matched in the current application session.

The next packet which the virtual processor 36 determines to be associated with the same application session will cause the virtual processor 36 to fill the instruction cache 42 with the sequential attack signature profile. The sequential attack signature profile includes information which causes virtual processor 36 to access the entry from a state cache 44 indicating that user Z has accessed application Y on server W. Based on the state cache entry, the virtual processor 36 executes instructions associated with the expression "is user Z attempting to access file A?" If the virtual processor 36 determines that this second packet associated with the application session includes data representative of an attempt to access file A, the second expression is satisfied and an unauthorized access attempt by user Z into file A has been recognized.

A timer/counter based attack signature profile directs the virtual processor 36 to execute instructions associated with a single expression on every data packet associated with a particular application session to determine whether an event has occurred a threshold number of times within a predetermined time interval. For instance, a timer/counter based attack signature profile might direct the virtual processor 36 to execute an instruction associated with the expression "is user Z attempting to access file A?" on every packet associated with a session application Y. The instructions also direct the virtual processor 36 to determine whether the number of attempts user Z makes to access file A exceeds 5 attempts within any 10 minute period. The first packet which the virtual processor 36 recognizes as being associated with an attempt by user Z to access file A causes the virtual processor 36 to activate a timer 37 and to set a counter 35 to one. The timer and counter information are entered into the state cache 44. Each subsequent detection of an attempt by user Z to access file A triggers the virtual processor 36 to access the timer and counter information from the state cache 44 and to determine whether the threshold has been met. If the threshold is met, a network intrusion has been detected and the virtual processor 36 notifies the reaction module 38.

Figure 5:
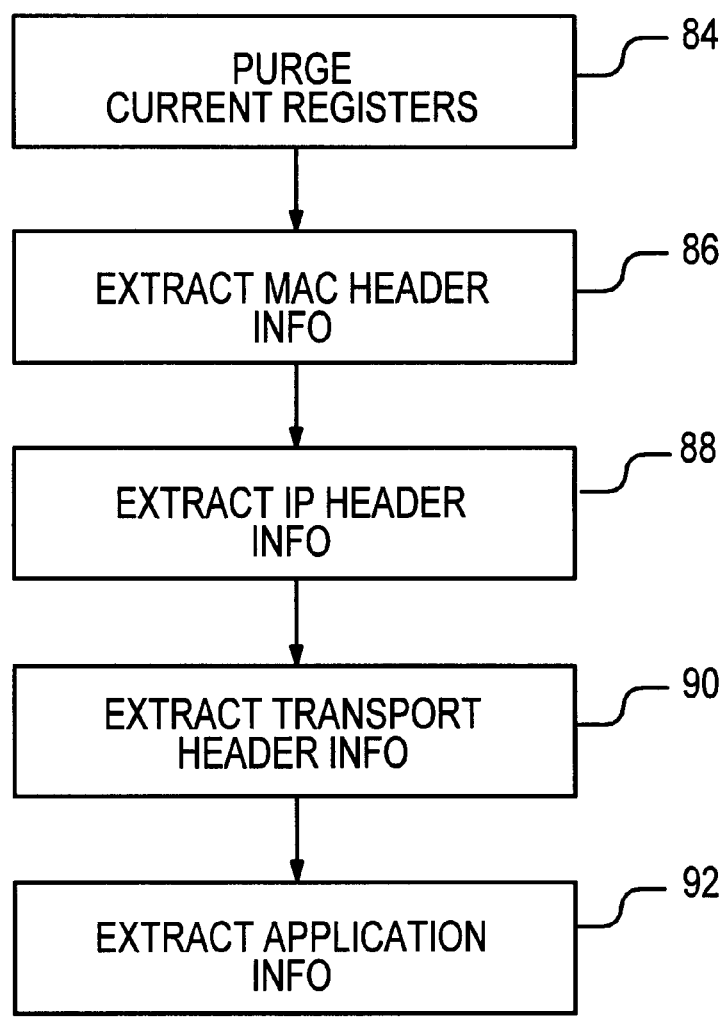
FIG. 5 is a process flow of a method for building a register cache during the operation of the virtual processor shown in FIG. 4.

Referring to FIG. 5, a method for building a register cache 40 during the operation of the virtual processor 36 includes purging the packet information in the current register in step 84 upon accessing a data packet from the packet queue. In step 86 the MAC header information is extracted from the packet, in step 88 the IP header information is extracted, in step 90 the transport header information is extracted from the packet, and in step 92 the application information is extracted from the data packet. All of the extracted packet information is entered into the register cache 40. The extracted packet information is utilized to create a session cache entry, which is essentially an application session history, and to access an appropriate set of attack signature profiles. The different types of packet information enable generation of attack signatures profiles which can recognize network intrusions based in the different layers of the OSI model.

Figure 6:
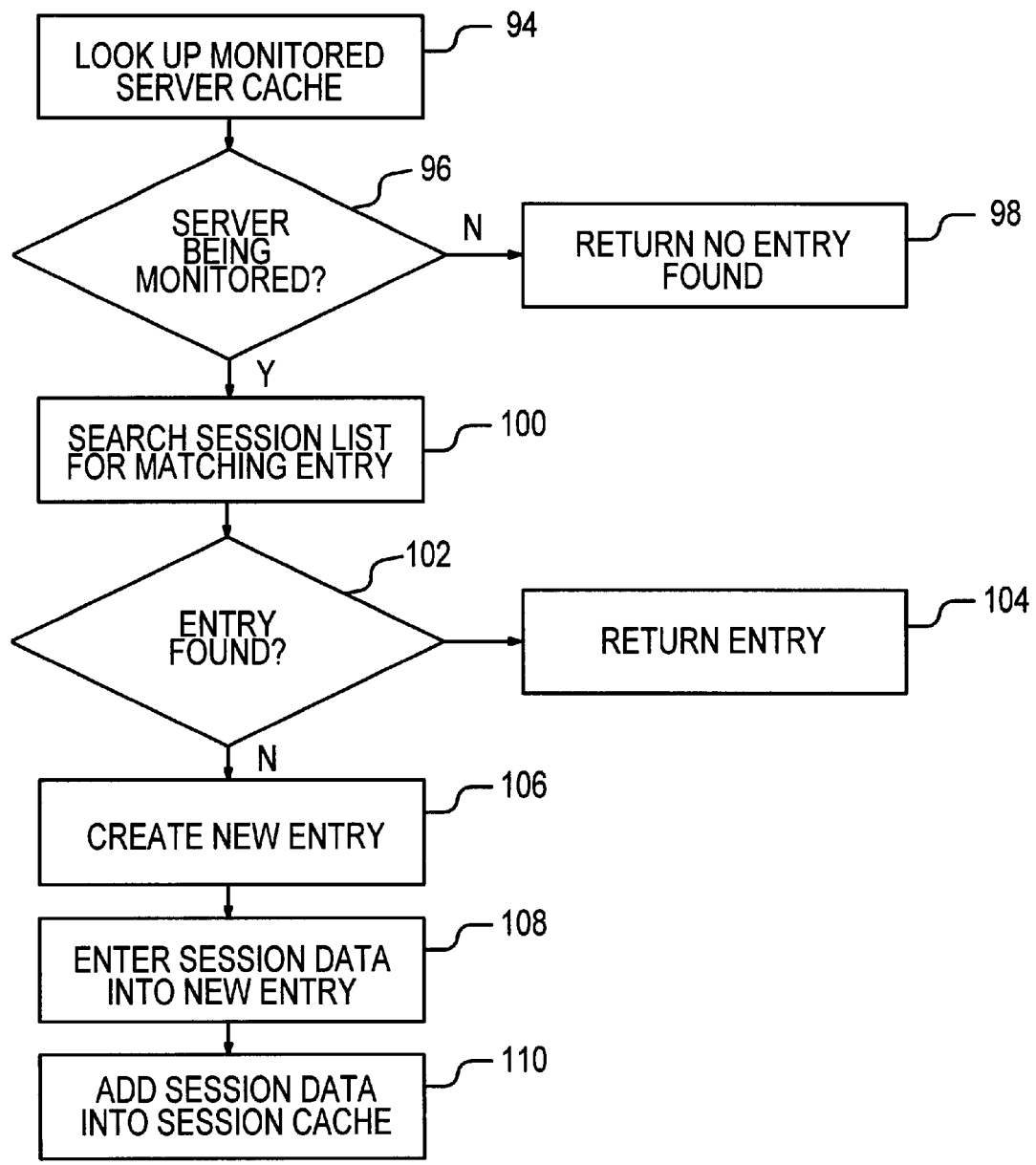
FIG. 6 is a process flow for a method of extracting a state cache entry during the operation of the virtual processor shown in FIG. 4.

Referring to FIG. 6, a method for extracting a session entry in the state cache 44 includes utilizing a serve IP address to look up the server in a monitored client/server cache (not shown) in step 94 to determine in step 96 whether the server is being monitored. If the server is not being monitored, in step 98 the virtual processor 36 is alerted that no entry was found for the server. If no entry is found for the server, the server is not being monitored for network intrusions and no further steps are taken. If the network object to which the data packet is directed is a client workstation instead of a server, the virtual processor 36 looks up the workstation in the client/server cache to determine whether the workstation is being monitored.

If the server is being monitored, in step 100 a session list in the state cache 44 is searched for a matching entry. Application information and the server IP address extracted from the packet into the register cache 40 are used to calculate a hash index, and the hash index is used to search for a matching entry from the session list. In step 102, it is determined whether a matching session entry was found. If a matching session entry is found, the entry is returned to the virtual processor 36 in step 104. The session entry might contain a record of timer/counter expressions executed on packets associated with the application session. For instance, the entry might reflect that within the application session a particular file within the application has been accessed ten times in the past twenty minutes. The virtual processor 36 uses this timer/counter information to determine whether a network intrusion is associated with the particular packet. The state cache 44 is also utilized to create a record of executed expressions in a sequential attack signature profile.

If no session entry is found in step 102, a new session entry is created in the session cache 44 in step 106. Session data, which includes any matches identified by executing attack signature profile instructions on a data packet, are entered into the new session entry in step 108 and the session entry is entered into the state cache 44 in step 110.

Figure 7:
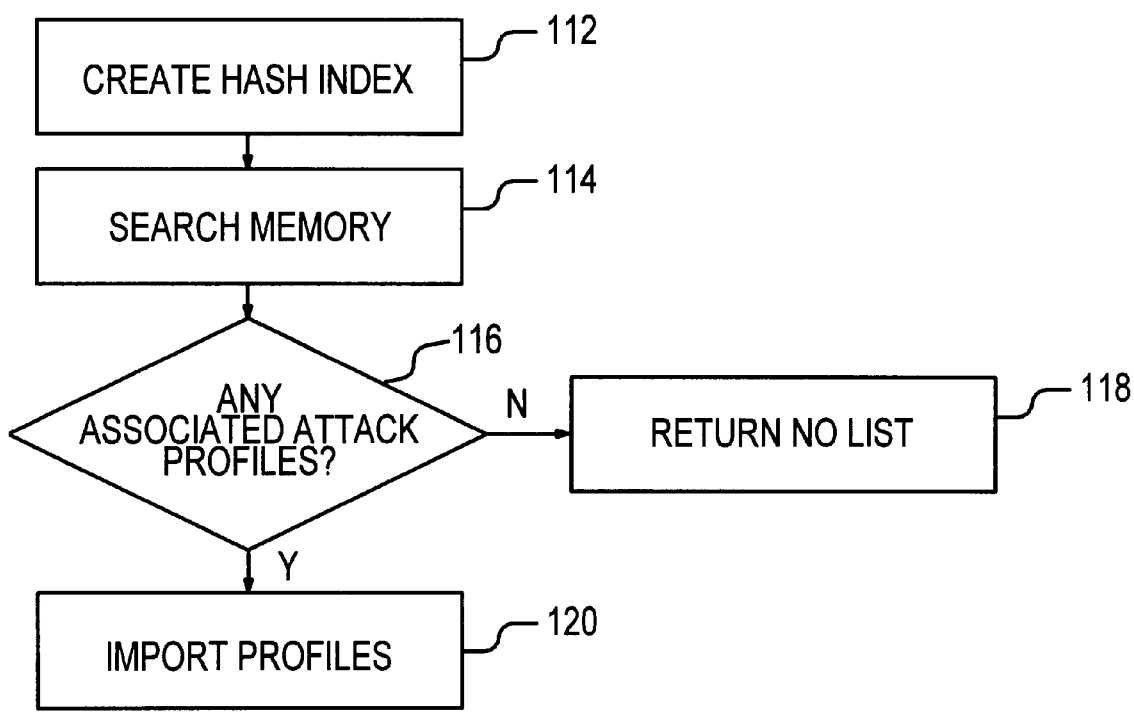
FIG. 7 is a process flow for a method for building an instruction cache with applicable attack signature profiles.

Referring to FIG. 7, a method for building the instruction cache 42 includes the step 112 of creating a hash index based on the server IP address and the application information in the register cache 40. Alternatively, if the network object being monitored is a workstation, the hash index can be created using an IP address of the workstation. In step 114 the hash index is used to search the signature profile memory 39 for a set of attack signature profiles corresponding to the server and application associated with the packet information in the register cache 40. In step 116 it is determined whether the server and application associated with the packet information correspond to a set of attack signature profiles. If the search reveals no corresponding profile, the virtual processor 36 is informed of the negative search result in step 118 and no further steps are taken with regard to executing attack signature profile instructions on the data packet. If the search identifies a corresponding profile, the attack signature profiles signatures are imported into the instruction cache in step 120.

Figure 8:
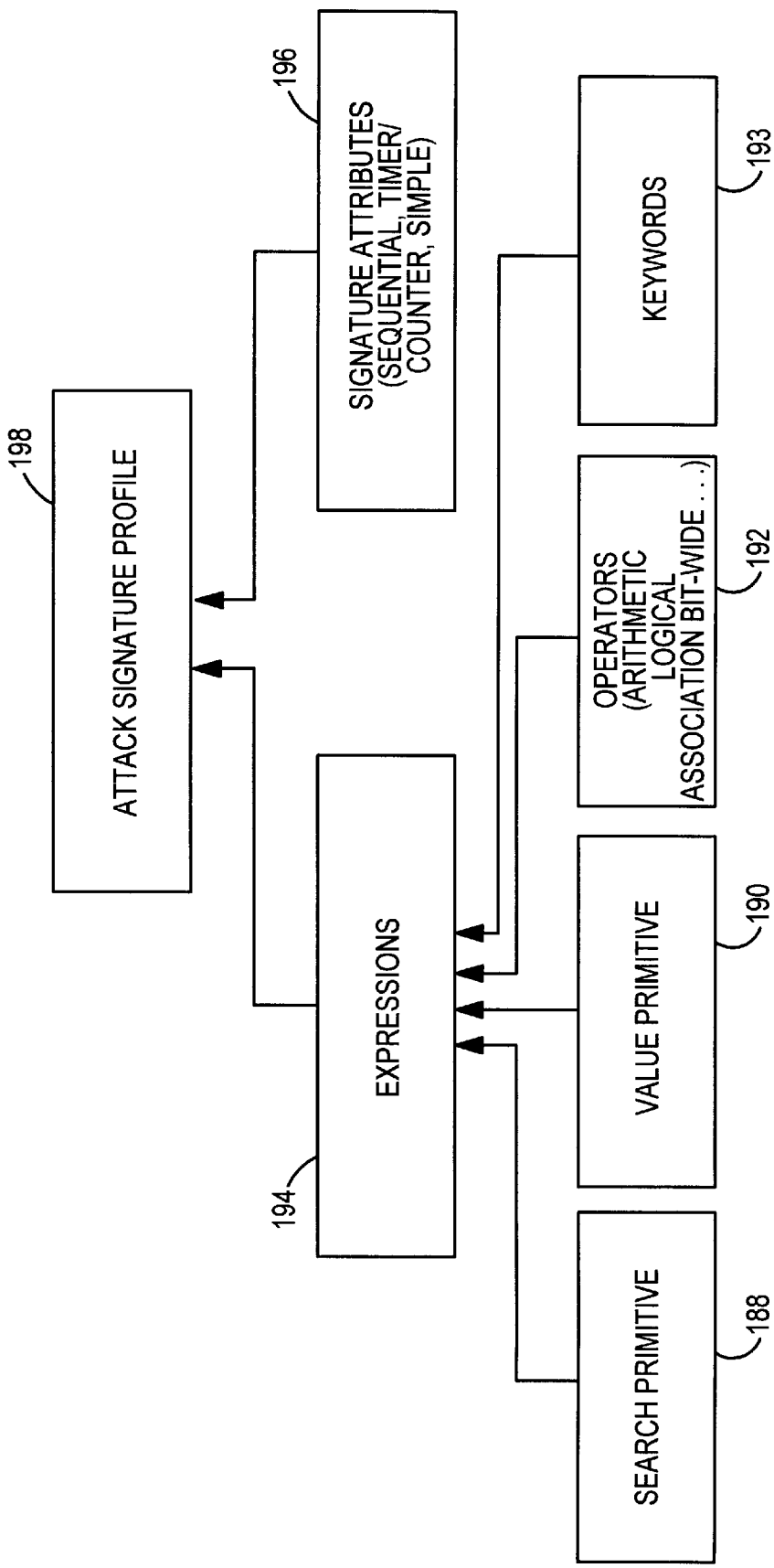
FIG. 8 is a schematic diagram of the components of an attack signature profiles.

With reference to FIG. 8, an attack signature profile 198 can be represented as at least one expression 194 in combination with a signature attribute 196, wherein the expressions can be composed of search primitives 188, value primitives 190, and operators 192. In a preferred mode, the expressions also include keywords 193. An example of an expression might be as follows: (IP AND S1 and (V1>200)), wherein "IP" is a keyword referring to a packet utilizing IP/TCP protocol, "S1" is a search primitive referring to user A, "AND" is a conjunctive operator, ">200" is an operator for indicating a value greater than 200, and "V1" is a value primitive referring to a packet length. Taken together, the entire expression describes a data packet which utilizes IP/TCP protocol, has a source address of user A and which has a packet length of greater than 200 bits.

The attribute 196 of an attack signature can be either sequential, timer/counter based, or simple. A simple attack signature attribute indicates that a attack signature profile consists of a single expression with an instruction is executed by the virtual processor 36 only once. A timer/counter based signature indicates that a single expression instruction is executed sequentially on each data packet associated with an application session until either the session is terminated or an intrusion is recognized. The timer 37 is used to enter a time stamp into a state cache entry each time an execution of a timer/counter expression instruction detects an event associated with an application session. The counter 35 logs and tracks the number of events within the predetermined time interval each time an event is detected by an execution of the timer/counter based instruction. Upon each execution of the timer/counter based instruction, a state cache entry associated with the application session being monitored is referenced to determine whether previous executions of the timer/counter based instruction together with the present execution have caused the threshold number of events to be reached within the predetermined time interval.

The sequential signature attribute refers to multiple expressions which are sequentially executed on successively transmitted data packets associated with an application session. If each of the expressions detects the event it was designed to detect, a network intrusion has been detected.

A more formal description of an attack signature in a loose BNR parsing grammar follows:

---

```
Pattern            := Hex or ASCII string of characters
Offset             := integer
Protocol           := one of the communication protocols, ie. MAC-layer
                      Network-layer, Transport-layer, or Application-layer
Extract_Type:=     Byte, Word, Long Word or String
Header_Field:=     Predefined keywords for communication
                      protocol header fields
Variable_Name:=    ASCII character string Name
SP                 :=<Pattern, Offset, Protocol> . . . Search Primitive
VP                 :=<Extract_Type, Offset, Protocol> . . . Value Primitive
OP                 :=<Logical> | <Arithmetic> | <Bit-wide> |
                      <Association> | . . . Operators
Basic_Expression:= <SP>|<OP>|<Header_Field|<SP OP SP>
                      | <SP OP VP | <SP OP Header_Field>
Assignment := <Variable_Name> "=" <Basic_Expression>
Complex_Expression := {(<Basic_Expression> OP <Basic
                      Expression>) . . . }
Expression         := <Complex_Expression> | <Complex_Expression>";"
                      {(<Assignment>";") . . . }
Signature_Attributes := <Simple> | <Counter-Timer-Based> |
                      <Sequential-occurrence>
Attack_Signature := <Signature_Attribute> { <Expression> . . . .}
```

---

Figure 9:
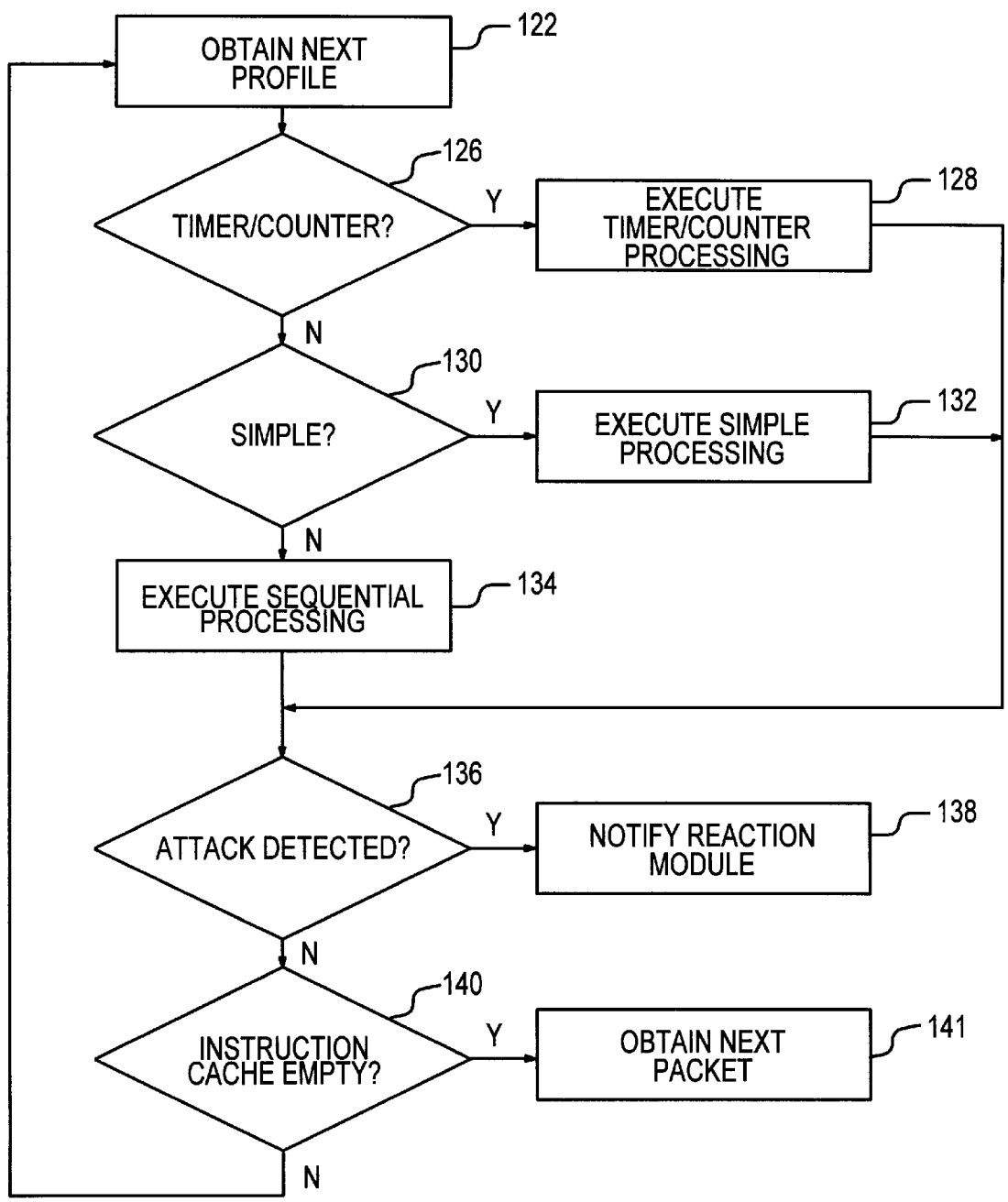
FIG. 9 is a process flow for a method of processing attack signature profile from an instruction cache.

With reference to FIG. 9, a method for processing attack signature profiles includes obtaining an attack signature profile from the instruction cache 42 in step 122. As previously noted, the attack signature profiles in the instruction cache 42 were accessed from the signature profile memory 39 based on the IP address of the server to which the packet was addressed and the application in the server to which the packet was directed. It is not necessary that the monitored network object be an application within a server. The object could be any network object, such as a particular server, a workstation, a firewall or a router, or a particular file within an application of the workstation.

In step 126 the virtual processor 36 determines if the attack signature profile has a timer/counter based attribute. If the attack signature profile has a timer/counter based attribute, in step 128 the virtual processor 136 executes timer/counter processing. If the profile's attribute is not timer/counter based, and if in step 130 the virtual processor 36 determines that the attack signature profile has a simple attribute, the virtual processor 36 executes simple signature processing in step 132. If the signature attribute is neither simple nor timer/counter based, the virtual processor 36 executes sequential processing in step 134. Although only simple, sequential, and timer/counter based attributes have been discussed, other signature attributes can be incorporated into the present invention.

In step 136 the virtual processor 36 determines if the execution of the attack signature has revealed a network intrusion. If the data collector 10 recognizes a network intrusion, in step 138 the reaction module 38 is notified. If no attack has been detected, in step 140 the virtual processor 36 determines if the instruction cache 42 is empty. If the instruction cache is not empty, the virtual processor 36 returns to step 122 and accesses the next attack signature profile. If the instruction cache 42 is empty, the next packet in the queue 48 is obtained in step 141 to extract packet information into the register cache 40.

Figure 10:
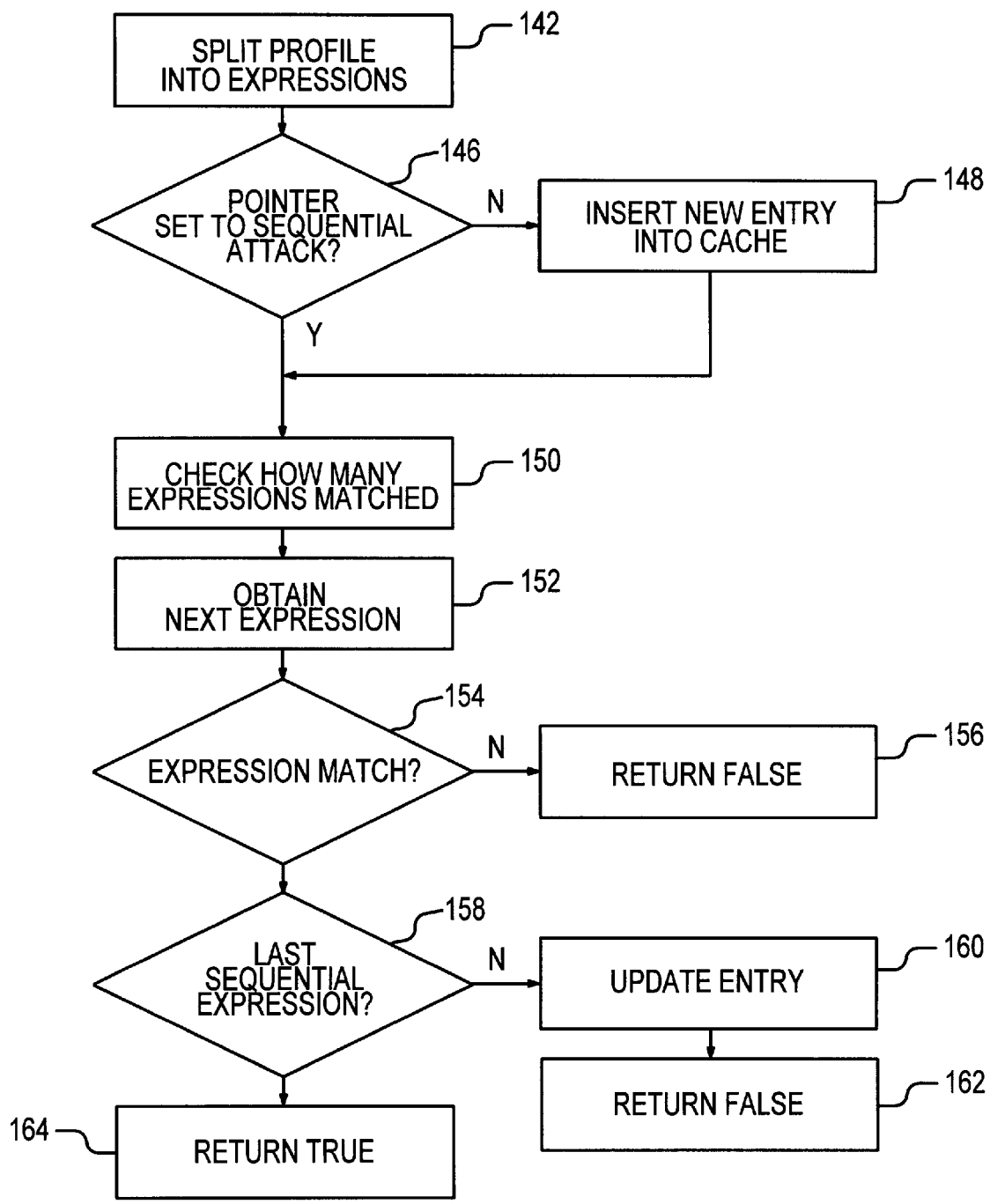
FIG. 10 is a process flow for a method for processing a sequential attack signature profile.

Referring to FIG. 10, a method for processing a sequential attack signature profile includes the step 142 of splitting the attack signature profile into expressions. As previously discussed, a sequential attack signature profile is composed of multiple component expressions which are sequentially evaluated to determine if each expression matches a data packet associated with a particular application session. In step 146 the virtual processor 36 determines whether a pointer is set to the sequential attack signature profile in the state cache 44. If the pointer is not set to the sequential attack signature profile, in step 148 an entry is made in the state cache 44 so that a pointer is set to the sequential attack signature profile and the entry parameters are initialized. In step 150, the virtual processor 36 references a state cache entry 44 to determine how many of the expressions have already been matched to data packets associated with the currently monitored application session.

In response to the state cache entry, the virtual processor 36 obtains the next sequential expression from an expression list in step 152. For example, an attack signature profile might include expressions A, B, and C. Expression instruction A was executed and found to match a first packet associated with an application session and expression instruction B was executed and found to match a second packet associated with the application session. Upon receiving a third packet associated with the application session and after referencing the state cache entry to obtain the information that expressions A and B have been matched, the virtual processor 36 obtains the third expression to determine if it matches the third packet. It should be noted that expressions A, B, and C need not be found to match three consecutive data packets associated with an application session. Rather, expression A must be found to match a packet which precedes a packet found to match expression B or C, and B must be found to match a data packet which precedes a packet found to match expression C.

In step 154, after executing an expression instruction, the virtual processor 36 determines whether the expression matches the data packet. If the expression does not match, the virtual processor 36 returns a false value in step 156. If the expression matches, a determination is made in step 158 whether the expression was the last sequential expression. In step 160, the virtual processor 36 updates the entry in the state cache 44 to reflect the match of the expression to the data packet if it is determined that the executed expression is not the last sequential expression and in step 162 the virtual processor returns a value of false. If the expression is the last sequential expression, in step 164 the virtual processor 36 returns a value of true to indicate that a network intrusion has been detected.

Figure 11:
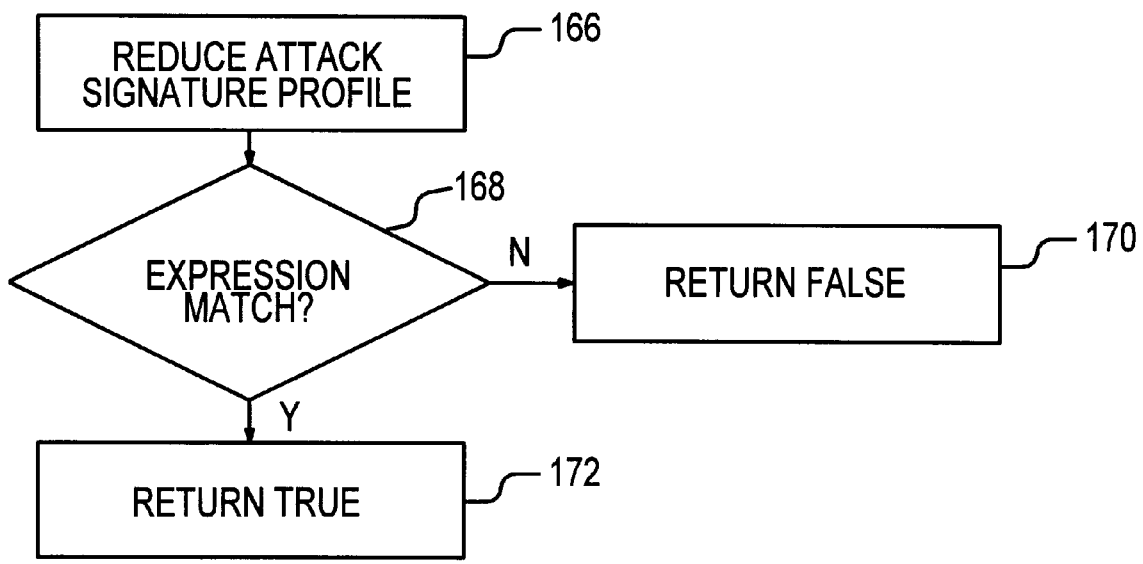
FIG. 11 is a process flow for a method for processing a simple attack signature profile.

The processing of a simple attack signature profile is similar to the processing of a single expression of a sequential attack signature. Referring to FIG. 11, the attack signature profile is reduced to an expression in step 166. After executing the expression instruction, the virtual processor 36 determines whether the expression matches a data packet associated with an application session in step 168. If the expression matches the packet, in step 172 the virtual processor 36 returns a value of true and the reaction module 38 is notified of a network intrusion. If the expression does not match, the virtual processor 36 returns a value of false in step 170.

Figure 12:
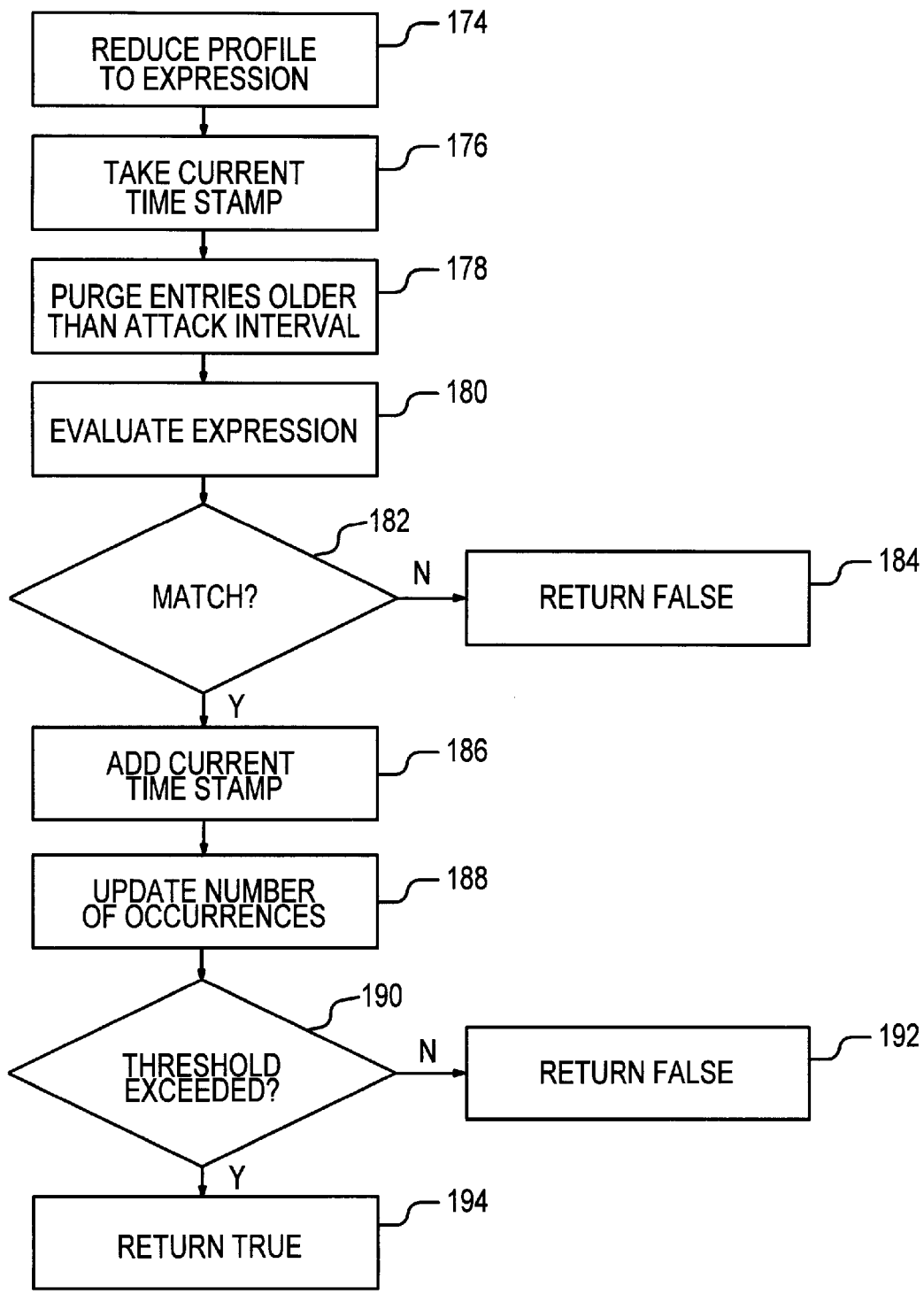
FIG. 12 is a process flow for a method for processing a timer/counter based attack signature profile.

With reference to FIG. 12, a method for processing a timer/counter based attack signature profile includes the step 174 of reducing the profile to an expression. In step 176 the virtual processor 36 utilizes the timer 37 to make a current time stamp for the data packet being evaluated. Entries in the state cache 44 that are older than an attack interval are purged from the state cache 44 in step 178. Purging stale entries involves comparing a time interval between time stamps associated with entries and the current time. If the actual time interval associated with an entry is greater than the attack signature time interval, that entry is purged from the state cache 44.

In step 180 the expression is evaluated to determine in step 182 if the expression matches the packet currently being analyzed. If the expression does not match, the virtual processor 36 returns a value of false in step 184. If the expression matches the packet, the virtual processor returns a value of true and adds the current time stamp to the application session entry in the state cache 44 in step 186. In step 188 the counter 35 is utilized to update the number of events recognized by execution of the timer/counter expression instruction on data packets associated with the current application session. A determination is made in step 190 whether, after the number of event occurrences has been updated, the threshold number of events has been detected within the predetermined time interval. A value of false is returned in step 192 if the threshold has not been reached. If the threshold has been reached, in step 194, the virtual processor 36 returns a true value to indicate that a timer/counter based network intrusion has been detected.

What is claimed is:

1. A method for detecting network intrusion attempts associated with network objects on a communications network including the steps of:

storing a list of attack signature profiles descriptive of attack signatures associated with said network intrusion attempts;

storing corresponding data representative of a correspondence between subsets of said attack signature profiles and said network objects such that each network object has a corresponding stored subset of attack signature profiles and more than one subset of attack signature profiles corresponds to network objects;

monitoring network traffic transmitted over said communications network for data addressed to one of said network objects;

in response to detecting said data addressed to said network object, accessing a subset of attack signature profiles corresponding to said network object based on said correspondence data; and executing at least one attack signature profile included in said subset corresponding to said network object to determine if said data addressed to said network object is associated with a network intrusion attempt.

2. The method of claim 1 wherein said executing step includes utilizing a processor to execute said at least one attack signature profile, the method further comprising the step of generating additional attack signature profiles to be added to said subsets of attack signature profiles in the absence of modifying said processor.

3. The method of claim 2 wherein said generating step includes generating an additional attack signature profile configured to recognize an occurrence of a predetermined threshold number of events within a predetermined time interval, said occurrence of said predetermined threshold number of events within said predetermined time interval constituting said network intrusion attempt.

4. The method of claim 1 wherein said executing step includes determining whether a particular sequence of events occurs which constitutes said network intrusion attempt.

5. The method of claim 1 wherein said steps of storing said list of attack signature profiles and storing said correspondence data include storing said subsets of said attack signature profiles and subsets of said correspondence data at a plurality of sites in different segments of said networks according to a distribution of said network objects on said network.

6. The method of claim 5 wherein said monitoring step includes monitoring network traffic at one of said plurality of sites for data addressed to a subset of said plurality of network objects having corresponding subsets of said attack signature profiles and corresponding subsets of said correspondence data stored at said site.

7. The method of claim 1 further comprising the step of alerting a network administrator if it is determined in said executing step that said data addressed to said network object is associated with said network intrusion attempt.

8. A network-based dynamic signature inspection system for detecting attack signatures on a network comprising:
   a data monitoring device configured to detect network data addressed to a first set of network objects, said monitoring device having an input for receiving said data and an output for signaling a detection of said data;
   signature profile memory including:
      a) attack signature profiles descriptive of network signaling patterns which constitute said attack signatures, each attack signature profile being configured to enable recognition of one of said attack signatures, each attack signature being associated with a known network security violation; and
      b) association data corresponding each of said first set of network objects to an associated subset of said attack signature profiles such that more than one of said subsets of said attack signature profiles corresponds to said first set of network objects; and
   processor means, responsive to said detection signaling, for processing an attack signature profile included in a subset of said signature profiles assigned to one of said first set of network objects, reception of a detection signal indicative of a detection by said monitoring device of data addressed to said network object triggering access by said processor means to said subset of said signature profiles assigned to said network object based on said association data.

9. The system of claim 8 further comprising an attack signature profile generator enabled to generate additional attack signature profiles to be included in said subsets of attack signature profiles, said additional attack signature profiles being configured for processing by said processor means in the absence of any corresponding modification of said processor means.

10. The system of claim 9 wherein said attack signature profile generator is further configured to generate said additional attack signature profiles for said first set of network objects based on security requirements of said first set of network objects.

11. The system of claim 9 further comprising a state cache connected to said processor means, said state cache having memory for storage of data representative of attack signature profile processing results.

12. The system of claim 11 wherein said attack signature profile generator is configured to generate a sequential attack signature profile with directions to said processor means to sequentially execute a set of instructions and to store results of each instruction execution in said state cache, a sequential occurrence of events detected by said execution of said instructions being indicative of a known network security violation.

13. The system of claim 8 further comprising an intrusion detection alert mechanism in communicative contact with said processing means, said detection alert mechanism being configured to perform a predetermined act if said processing of said attack signature profile reveals a network intrusion, said predetermined act being one of alerting a network administrator, denying access to said network object, or tracing an application session associated with said network intrusion.

14. A network-based dynamic signature inspection system for detecting attack signatures on a network comprising:
   a data monitoring device configured to detect network data addressed to a first set of network objects, said monitoring device having an input for receiving said data and an output for signaling a detection of said data;
   signature profile memory including:
      a) attack signature profiles descriptive of network signaling patterns which constitute said attack signatures, each attack signature profile being configured to enable recognition of one of said attack signatures, each attack signature being associated with a known network security violation; and
      b) association data corresponding each of said first set of network objects to an associated subset of said attack signature profiles such that more than one of said subset of said attack signature profiles corresponds to said first set of network objects; and
   processor means, responsive to said detection signaling, for processing an attack signature profile included in a subset of said signature profiles assigned to one of said first set of network objects, reception of a detection signal indicative of a detection by said monitoring device of data addressed to said network object triggering access by said processor means to said subset of said signature profiles assigned to said network object based on said association data wherein said data monitoring device, said signature profile memory, and said processor means are all contained in a first data collector located on a first network segment on which said first set of said network objects reside, said system further comprising:
   a second data collector including a second data monitoring device, a second signature profile memory, and second processor means, said second data collector being located on a second network segment including a second set of said network objects, said second processor means being a duplicate of said first processor means; and
   a network configuration generator configured to assign a first plurality of said signature profile subsets to said first data collector based on a configuration of said first set of network objects and to assign a second plurality of signature profile subsets to said second data collector based on a configuration of said second set of network objects.

15. A method for providing network intrusion detection on a network including first and second network objects comprising the steps of:

storing first and second sets of attack signature profiles associated respectively with first and second network objects at a first site on said network, each attack signature profile being configured to detect a network signaling pattern associated with a known network security violation;

monitoring network traffic at said first site for data addressed to one of said first and second network objects;

upon detecting data addressed to said first network object, accessing said first set of attack signature profiles;

utilizing a processor to execute an attack signature profile from said first set of attack signature profiles;

determining whether said execution of said attack signature profile reveals a known network security violation; and generating additional attack signature profiles configured to be executed by said processor in the absence of modifying said processor.

16. The method of claim 15 further comprising the steps of:

deploying a duplicate of said processor at a second site on said network;

storing a third set of attack signature profiles associated with a third network object at said second site;

monitoring said network traffic at said second site for network data addressed to said third network object; and executing at least one attack signature profile in said third set of attack signature profiles at said second site upon detecting said network data addressed to said third network object.

17. The method of claim 15 wherein said executing step includes determining whether a predetermined number of events occur within a predetermined time interval.

18. The method of claim 15 wherein said step of utilizing said processor to execute said attack signature profile includes:

translating said attack signature profile into a set of instructions to be sequentially executed to enable recognition of a set of sequentially occurring events which collectively constitute said known network security violation;

sequentially executing said set of instructions; and upon recognizing each of said set of events, storing data representative of an occurrence of said each event.

19. The method of claim 18 wherein said determining step includes determining whether said known security violation has occurred based on said stored data representative of said occurrence of said each event.

20. A computer system comprising:

a plurality of attack signature profiles comprising machine readable data corresponding to attack signatures associated with network intrusion attempts; and corresponding data comprising machine readable data representative of a correspondence between a plurality of network objects and subsets of attack signature profiles.

* * * * *